(12) United States Patent
Bhatt et al.

(10) Patent No.: US 10,628,980 B2
(45) Date of Patent: Apr. 21, 2020

(54) HIGH-PERFORMANCE GRAPH RENDERING IN BROWSERS

(71) Applicant: Nuntanix, Inc, San Jose, CA (US)

(72) Inventors: Rajesh P. Bhatt, San Jose, CA (US); Deepa Tuteja Kakani, San Jose, CA (US); Jacqueline Kwawu, San Jose, CA (US); Ken Chen, San Francisco, CA (US); Ting Suk Lee, Cupertino, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 15/965,524

(22) Filed: Apr. 27, 2018

(65) Prior Publication Data

US 2019/0130613 A1 May 2, 2019

Related U.S. Application Data

(63) Continuation-in-part of application No. 29/624,186, filed on Oct. 30, 2017.

(51) Int. Cl.

| | |
|---|---|
| *G06T 11/20* | (2006.01) |
| *G06T 13/80* | (2011.01) |
| *G06F 8/34* | (2018.01) |
| *G06F 8/41* | (2018.01) |
| *G06F 16/904* | (2019.01) |
| *G06F 16/901* | (2019.01) |
| *G06F 17/22* | (2006.01) |

(52) U.S. Cl.
CPC .............. *G06T 11/206* (2013.01); *G06F 8/34* (2013.01); *G06F 8/41* (2013.01); *G06F 16/904* (2019.01); *G06F 16/9024* (2019.01); *G06F 17/2247* (2013.01); *G06T 13/80* (2013.01)

(58) Field of Classification Search
CPC . G06F 8/34; G06F 8/41; G06F 16/904; G06F 17/20; G06T 11/206; G06T 13/80
See application file for complete search history.

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |

(Continued)

OTHER PUBLICATIONS

"Creating Shapes". CodeProject. Feb. 6, 2018. 8 pages.
(Continued)

*Primary Examiner* — Michael Le
(74) *Attorney, Agent, or Firm* — Vista IP Law Group, LLP

(57) ABSTRACT

Systems for rendering graphs in browsers. A method embodiment for generating and manipulating a high-performance graph in a browser commences by receiving a set of node descriptions of the graph as well as a set of edge descriptions of the graph. In a first display layer, one or more HTML primitives are assigned to the individual ones of the set of nodes. In a second display layer, one or more non-HTML display graphical elements are assigned to the individual ones of the set of edges. The edges and nodes are sorted into a painting order based on size. The first layer and the second layer are combined into an HTML document that comprises at least some of the HTML primitives that correspond to the nodes as well as at least some of the non-HTML display graphical elements that correspond to the edges of the graph. The browser renders the graph.

20 Claims, 9 Drawing Sheets

(56) References Cited

U.S. PATENT DOCUMENTS

| | | | |
|---|---|---|---|
| 8,850,130 | B1 | 9/2014 | Aron et al. |
| 8,997,097 | B1 | 3/2015 | Aron et al. |
| 9,052,936 | B1 | 6/2015 | Aron et al. |
| 9,256,374 | B1 | 2/2016 | Aron et al. |
| 9,256,475 | B1 | 2/2016 | Aron et al. |
| 9,354,912 | B1 | 5/2016 | Aron et al. |
| 9,389,887 | B1 | 7/2016 | Aron et al. |
| 9,575,784 | B1 | 2/2017 | Aron et al. |
| 9,619,257 | B1 | 4/2017 | Aron et al. |
| 9,772,866 | B1 | 9/2017 | Aron et al. |
| 2008/0094399 | A1* | 4/2008 | Heinkel ............... G06T 11/206 345/440 |
| 2010/0079462 | A1* | 4/2010 | Breeds ............... G06T 11/206 345/440 |
| 2012/0110384 | A1* | 5/2012 | Brunet ............... G06F 11/3624 714/37 |
| 2013/0187941 | A1* | 7/2013 | Noon ............... G06T 11/60 345/589 |
| 2013/0229416 | A1* | 9/2013 | Krajec ............... G06T 11/206 345/440 |
| 2016/0334974 | A1* | 11/2016 | Gray ............... G06F 3/04845 |

OTHER PUBLICATIONS

Occil, Peter. "Creating shapes using the Public Domain HTML 3D Library". CodeProject. Jan. 10, 2017. 8 pages.
"Getting started with NoFlo". NoFlo. Jul. 13, 2017. 11 pages. Retrieved from: https://web.archive.org/web/20170713073202/https://noflojs.org/documentation/.
"Interactive JavaScript Diagrams in HTML". GoJS by Northwoods Software. Dec. 15, 2017. 6 pages. Retrieved from: https://web.archive.org/web/20171215032424/https://gojs.net/latest/index.html.
Rappid FAQ. Dec. 9, 2016. 5 pages. Retrieved from: https://web.archive.org/web/20161209043128/https://www.jointjs.com/faq.
"Core concepts". Viewflow. Sep. 24, 2017. 10 pages. Retrieved from: https://web.archive.org/web/20170924193153/http://docs.viewflow.io/viewflow_core.html.
"Documentation". Viewflow. Sep. 10, 2017. 4 pages. Retrieved from: https://web.archive.org/web/20170910204151/http://docs.viewflow.io/.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
3OITRAS, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Restriction Requirement dated Jul. 30, 2019 for related U.S. Appl. No. 29/624,186.
"Set default pawn class to change depending on selection" Sep. 29, 2015, UE4 ANSWERHUB, site visited Jul. 25, 2019: https://answers.unrealengi ne.com/questions/31 0708/set-default-pawn-class-to-change-depending-on-sele.html (Year: 2015).
"My Human Computer Interface Journal" Feb. 24, 2016, Blogspot, site visited Jul. 25, 2019: http://rnyhurnancornputerinterfacejournal.blogspot.corn/ (Year: 2016).
Non-Final Office Action dated Oct. 23, 2019 for related U.S. Appl. No. 29/624,186.
Gaillard, Sebastien, "Footsteps Material Management using Wwise / Unreal Engine 4 / Unity 3D" Sep. 29, 2016, audiokinetic, site visited Oct. 17, 2019: https://blog.audiokinetic.com/-unity-3d/ (Year: 2016).
"How can i make a health system and bar in the fps blueprint." May 4, 2015, Unreal Enginge, site visited Oct. 17, 2019: https: 1/forums.unrealengine.com/development-discussion/content-creation/40067-how-can-i-make-a-health-system-and-bar-in-the-fps-blueprint (Year: 2015).
"Level blueprint—loop movement (matinee)" May 7, 2017, Unreal Engine, site visited Oct. 17, 2019: https://forums.unrealengine.com/development-discussion/blueprint-visual-scripting/117230-level-blueprint-loop-movement-matinee (Year: 2017).
"Toggle Visibility of a Component in another blueprint?" Apr. 27, 2016, Unreal Engine, site visited Oct. 17, 2019: https://answers.unrealengine.com/questions/411886/toggle-visibility-of-a-component-in-another-bluepr.html (Year: 2016).
Cano, I. et al., "Curator: Self-Managing Storage for Enterprise Clusters", *14th USENIX Symposium on Networked Systems Design and Implementation, NSDI '17*, (Mar. 27, 2017).

* cited by examiner

HIGH-PERFORMANCE GRAPH RENDERING IN BROWSERS

RELATED APPLICATIONS

The present application is a continuation-in-part of, and claims the benefit of priority to co-pending U.S. patent application Ser. No. 29/624,186 titled "CLUSTER NETWORK VISUALIZATION FOR A DISPLAY SCREEN OR PORTION THEREOF", filed Oct. 30, 2017, which is hereby incorporated by reference in its entirety.

FIELD

This disclosure relates to browser rendering techniques, and more particularly to techniques for high-performance graph rendering in browsers.

BACKGROUND

Graphs involving nodes and edges are used ubiquitously in many settings. For example, many mathematical problems can be represented as graphs of nodes and edges. As another example, relationships between locations (e.g., cities) on a map can be represented as nodes of a graph, and relationships between the locations (e.g., distances) can be represented as labeled edges. As a further example, components of a computing system can be represented as a graph where the components are represented as nodes, and the edges can be labeled with one or more relationships between the nodes.

Unfortunately, when rendering such graphs in a browser (e.g., an HTML browser such as Firefox or Chrome), the computing processes involved in the rendering consume an inordinate amount of computing resources. This often introduces user frustration which in turn detracts from the user experience. Therefore, what is needed is a technique or techniques that address poor browser performance when rendering certain types of graphs in HTML.

SUMMARY

The present disclosure describes techniques used in systems, methods, and in computer program products for high-performance graph rendering in browsers, which techniques advance the relevant technologies to address technological issues with legacy approaches. More specifically, the present disclosure describes techniques used in systems, methods, and in computer program products for high-performance graph rendering in HTML browsers that support both HTML primitives and non-HTML graphical elements. Certain embodiments are directed to technological solutions that construct the graphs using only graphical components that are known to render with good performance in HTML browsers.

The disclosed embodiments modify and improve over legacy approaches. In particular, the herein-disclosed techniques provide technical solutions that address the technical problems attendant to representation of certain types of graphs in HTML using combinations of HTML primitives and scalable vector graphic (SVG) components. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication.

Some embodiments disclosed herein use techniques to improve the functioning of multiple systems within the disclosed environments, and some embodiments advance peripheral technical fields as well. As specific examples, use of the disclosed computer equipment, networking equipment, and constituent devices within the shown environments as described herein and as depicted in the figures provide advances in the technical field of high-performance computer visualizations as well as advances in various technical fields related to hypertext markup language compilers.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
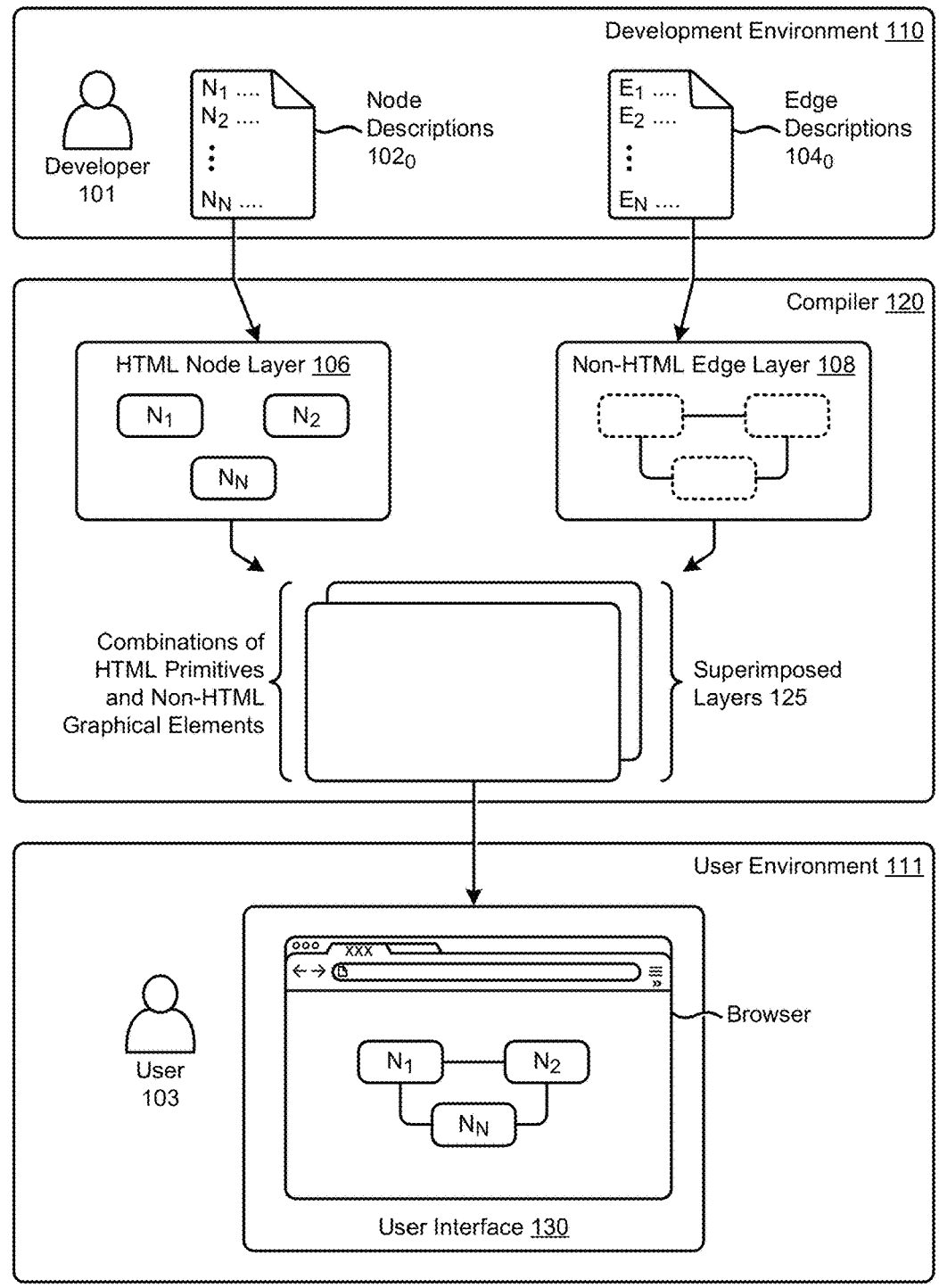
FIG. 1 illustrates a computing environment in which embodiments of the present disclosure can be implemented.

Embodiments in accordance with the present disclosure address the problem of slow graph rendering in HTML browsers. Some embodiments are directed to approaches that construct the graphs using only graphical components that are known to render efficiently in browsers. The accompanying figures and discussions herein present example environments, systems, methods, and computer program products for high-performance graph rendering in HTML browsers.

OVERVIEW

Described herein are techniques for separating the graphical elements that are used to represent nodes of a graph from the graphical elements that are used to represent edges of the graph. Graphical elements that are "fast" (e.g., certain shapes that are native to the browser) such as HTML primitives are used wherever possible. However, graphical elements such as graph edges that are observed to render slowly in legacy systems are substituted with non-primitive graphical elements.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

The figure depicts capture of nodes and edges of a graph into files or data structures (e.g., by developer 101). Next, a compiler 120 is used to organize visual aspects of the graph into superimposed layers 125 that can be rendered by a browser. In the shown development environment 110, developer 101 initially captures the nodes and edges of the graph into files, and then runs the compiler 120. A user 103, possibly the developer himself, operates a browser in a user environment 111. The user environment 111 might be different, or might be the same as development environment 110. The graph is rendered in user interface 130

The shown flow begins when a developer captures the nodes and edges of a graph in a development environment 110. The developer 101 describes a first portion of an intended graph visualization by editing a file or data structure that comprises node descriptions $102_0$. Also, developer 101 describes a second portion of an intended graph visualization by editing a file or data structure that comprises edge descriptions $104_0$ for the intended graph visualization. As heretofore mentioned, the nodes and edges of the graph are processed separately. In this embodiment, a compiler 120 receives as input (1) the node descriptions $102_0$ and, (2) the edge descriptions $104_0$.

The foregoing discussion of FIG. 1 is merely one example flow involving one particular development environment, one particular compiler, and one particular user environment. Many variations and/or implementations of the foregoing are reasonable. Moreover, both the development environment and the user environment can support various tools and/or techniques that facilitate generation of the shown combinations of HTML primitives and non-HTML graphical elements. Some such variations are disclosed in further detail as follows.

Figure 2:
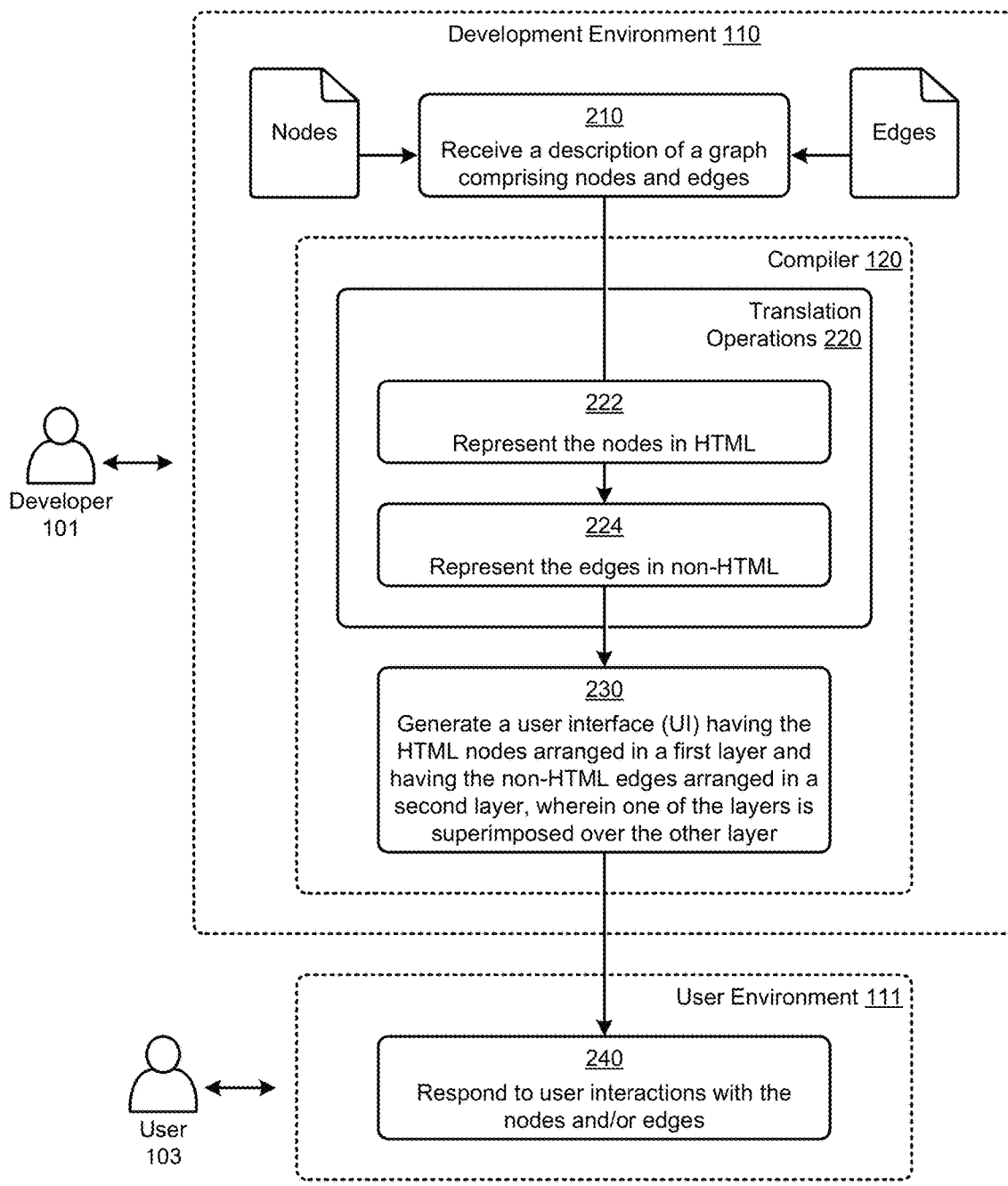
FIG. 2 depicts a graph rendering technique as used in systems that employ HTML browsers to display graph visualizations, according to an embodiment.

FIG. 2 depicts a graph rendering technique 200 as used in systems that employ HTML browsers to display graph visualizations. As an option, one or more variations of graph rendering technique 200 or any aspect thereof may be implemented in the context of the architecture and functionality of the embodiments described herein. The graph rendering technique 200 or any aspect thereof may be implemented in any environment.

As shown, development environment 110 of FIG. 2 includes a set of translation operations that serve to translate from a description of a graph (e.g., as may be codified in files or data structures) into a representation that can be rendered by an HTML browser. Initially, in step 210, representations of nodes (e.g., from a first portion of a file or data structure) and representations of edges (e.g., from a second portion of a file or data structure) are received and pre-processed (e.g., formatted) in any manner as might be proscribed by compiler 120. In this embodiment, the compiler includes translation operations 220 that in turn include operation 222 to represent the nodes in HTML and operation 224 to represent the edges in non-HTML.

The translation of nodes and edges separately using different representations serves to seize advantage of high-performance of browsers when rendering certain HTML primitives while avoiding use of other graphical elements that have been discovered to be slow and/or inefficient. As such, operation 230 serves to generate a high-performance user interface that includes high-performance graph visualizations that can be rendered by common browsers.

In this particular embodiment, operation 230 arranges the nodes in a first graphical layer (e.g., a first sprite), then arranges the edges in a second layer (e.g., a second sprite), and superimposes the edge layer over node layer. This is merely one example. In an alternative embodiment, the nodes can be arranged in a first graphical layer (e.g., a first sprite) and the edges arranged in a second graphical layer (e.g., a second sprite), and then the node layer is superimposed over the edge layer. As is discussed herein, there are performance features, display features, and user interaction features that can be implemented on the basis of how layers are superimposed and/or how graphical elements within a layer are sorted for rendering.

Some of the aforementioned user interaction features facilitate user manipulation of the graph (operation 240). User interaction might include mouse clicks on nodes and/or mouse clicks on edges. In some embodiments, the user interface responds to hovering a mouse cursor or other pointing device over a node or an edge. In some cases, the user interface response is based at least in part on execution of JavaScript and/or other code that can be interpreted or executed by the browser.

The foregoing discussion of FIG. 2 includes one partitioning of a standalone development environment and one partitioning of a standalone user environment. In many cases, both the development environment and the user environment observe a client-server model, one possible embodiment of which is disclosed in further detail in FIG. 3.

Figure 3:
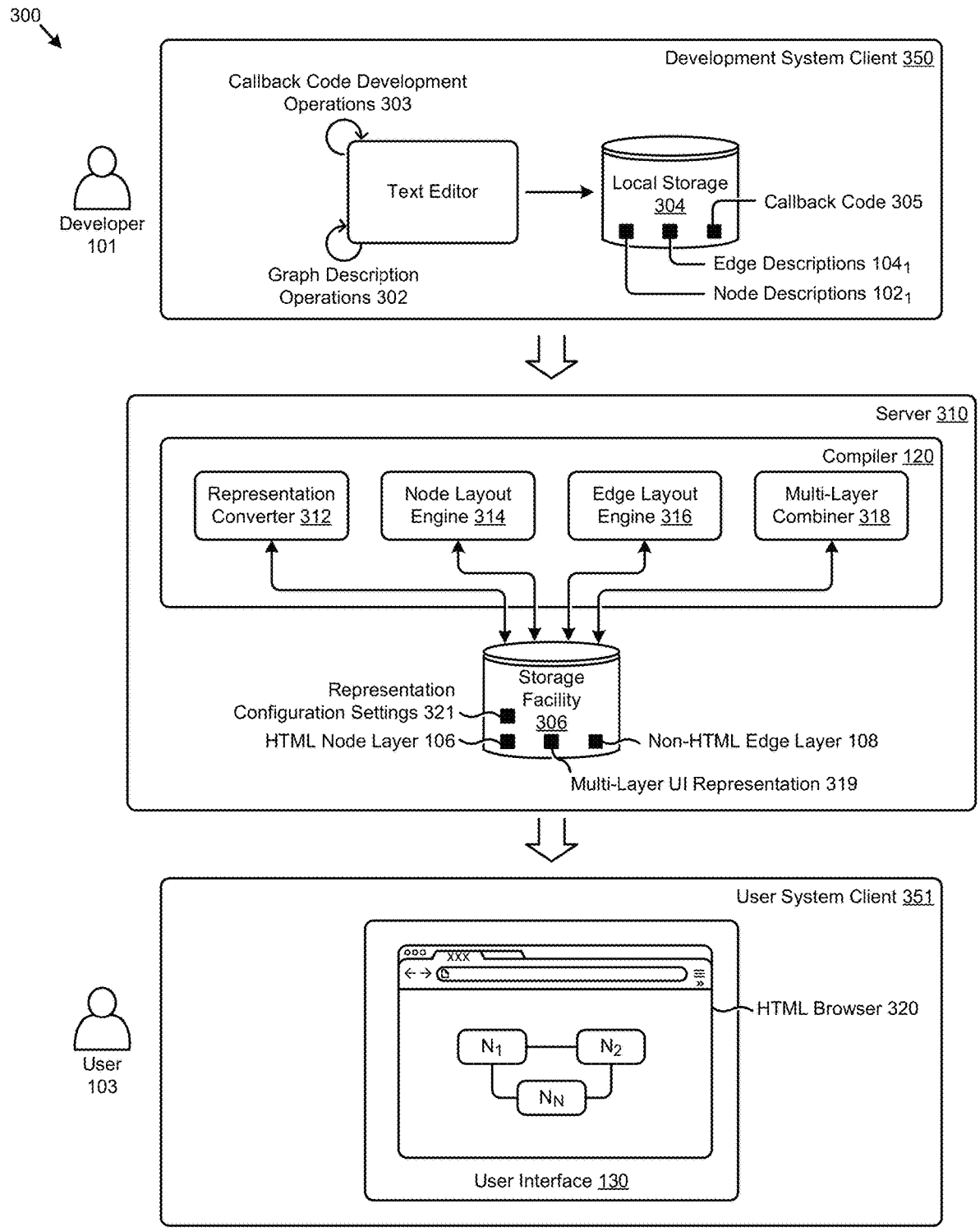
FIG. 3 depicts a client-server model that supports systems in which nodes and edges of graph visualizations are processed separately to achieve high-performance graph rendering in HTML browsers, according to an embodiment.

FIG. 3 depicts a client-server model 300 that supports systems in which nodes and edges of graph visualizations are processed separately to achieve high-performance graph rendering in HTML browsers. As an option, one or more variations of client-server model 300 or any aspect thereof may be implemented in the context of the architecture and functionality of the embodiments described herein. The client-server model 300 or any aspect thereof may be implemented in any environment.

As shown, a server 310 includes a storage facility (e.g., storage facility 306). Such a storage facility is able to serve as a repository for user interface HTML code that is served to a user interface 130 situated in a user system client 351. Also, the storage facility is able to serve as a repository for results of compiler components (e.g., representation converter 312, node layout engine 314, edge layout engine 316, and/or multi-layer combiner 318). The compiler 120 can be situated entirely within the server 310 (as shown), or certain functions of the compiler can be distributed between the server 310 and development system client 350. In either case, the compiler outputs a multi-layer user interface (UI) representation 319 that combines an HTML node layer 106 with a non-HTML edge layer 108 such that an HTML browser can present the graph visualization for user manipulation.

The development system client can include tools as might be used in a development setting such that developer 101 can capture both graphical descriptions (e.g., edge descriptions 104₁ and node descriptions 102₁) as well as executable code (e.g., callback code 305).

As shown, the development system client includes a text editor. Developer 101 performs any number of editing cycles using the text editor to perform any of a variety of callback code development operations 303 and/or any number of graph description operations 302. Any results of such text editing can be stored in local storage 304 as shown, or results of such text editing can be stored in storage facility 306 of server 310.

The user system client 351 can include any applications that are relevant to a user. In some cases, user 103 is an administrator of a computing system and might have administrative tools on hand. In other cases, a user is a researcher and might have research-oriented tools on hand. As shown, the user system client 351 comprises at least HTML browser 320.

The foregoing discussion of the compiler 120 in FIG. 3 includes mention of representation converter 312. The function of this module relies in part on representation configuration settings 321. Such representation configuration settings might characterize formats for outputs of any operation of the compiler. Strictly as one example, representation configuration settings 321 might include a requirement to output the multi-layer UI representation 319 in a format that comports with, for example, HTML 5.0. As another example, representation configuration settings 321 might include a requirement to output HTML node layer 106 in a format that comports with, for example HTML, 2.0. As yet another example, representation configuration settings 321 might include a requirement to output non-HTML edge layer 108 using only graphical elements that comports with, for example, SVG 1.1 or SGV 2.0.

Figure 4:
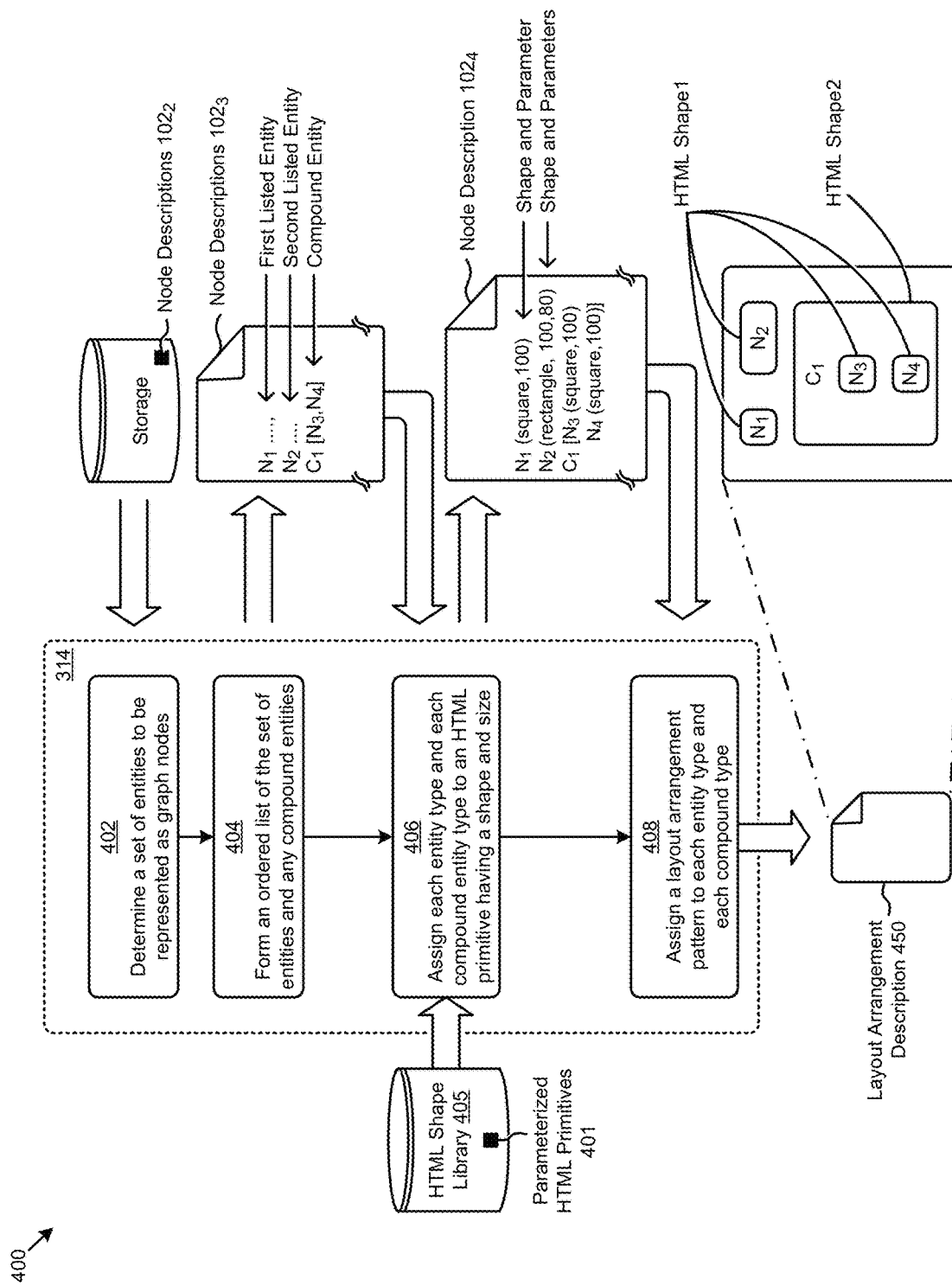
FIG. 4 illustrates an example node layout engine data flow that is used to process nodes and edges separately for high-performance graph rendering in HTML browsers, according to an embodiment.
Figure 5:
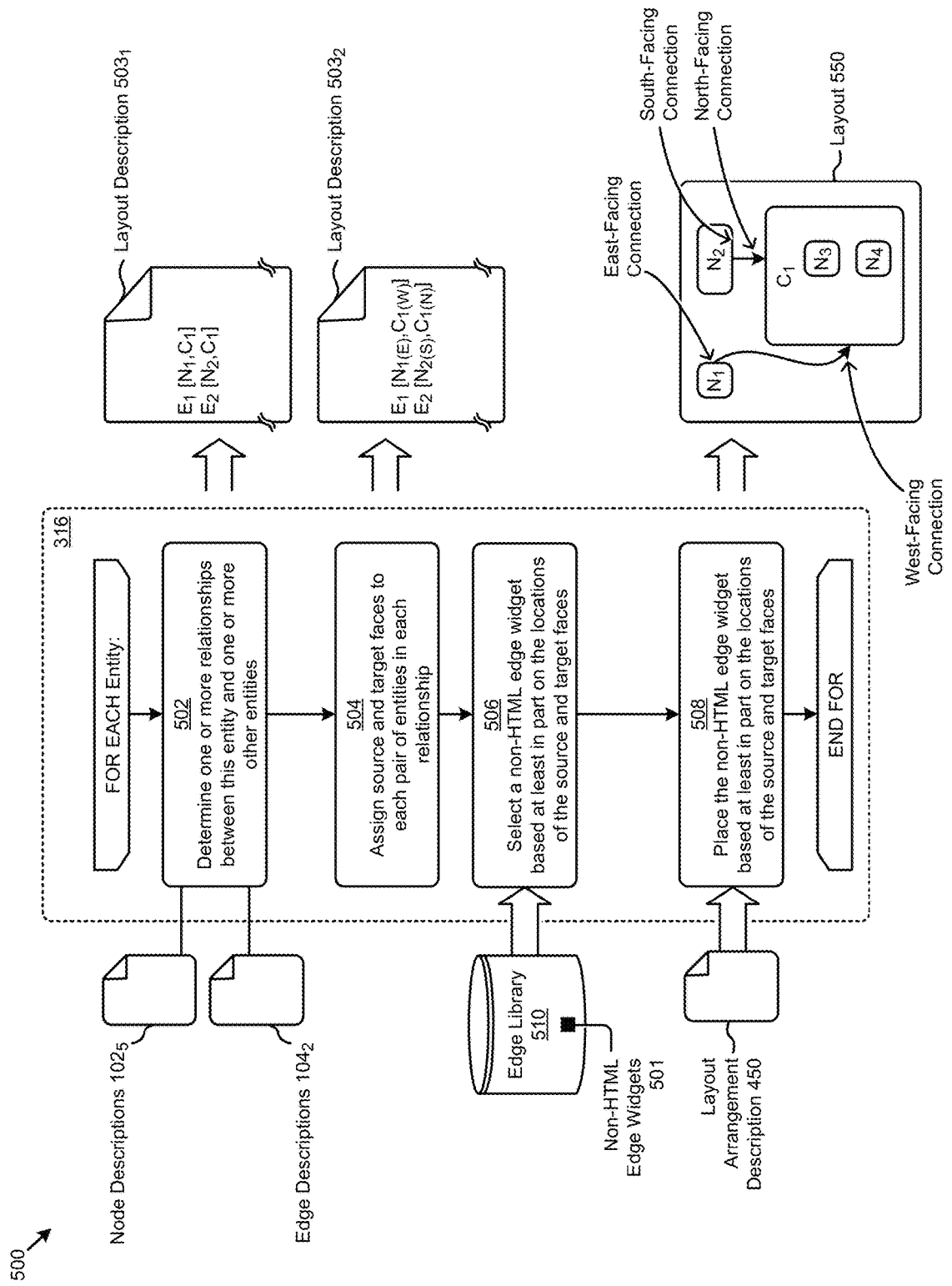
FIG. 5 illustrates an example edge layout engine data flow that is used to process nodes and edges separately for high-performance graph rendering in HTML browsers, according to an embodiment.
Figure 6:
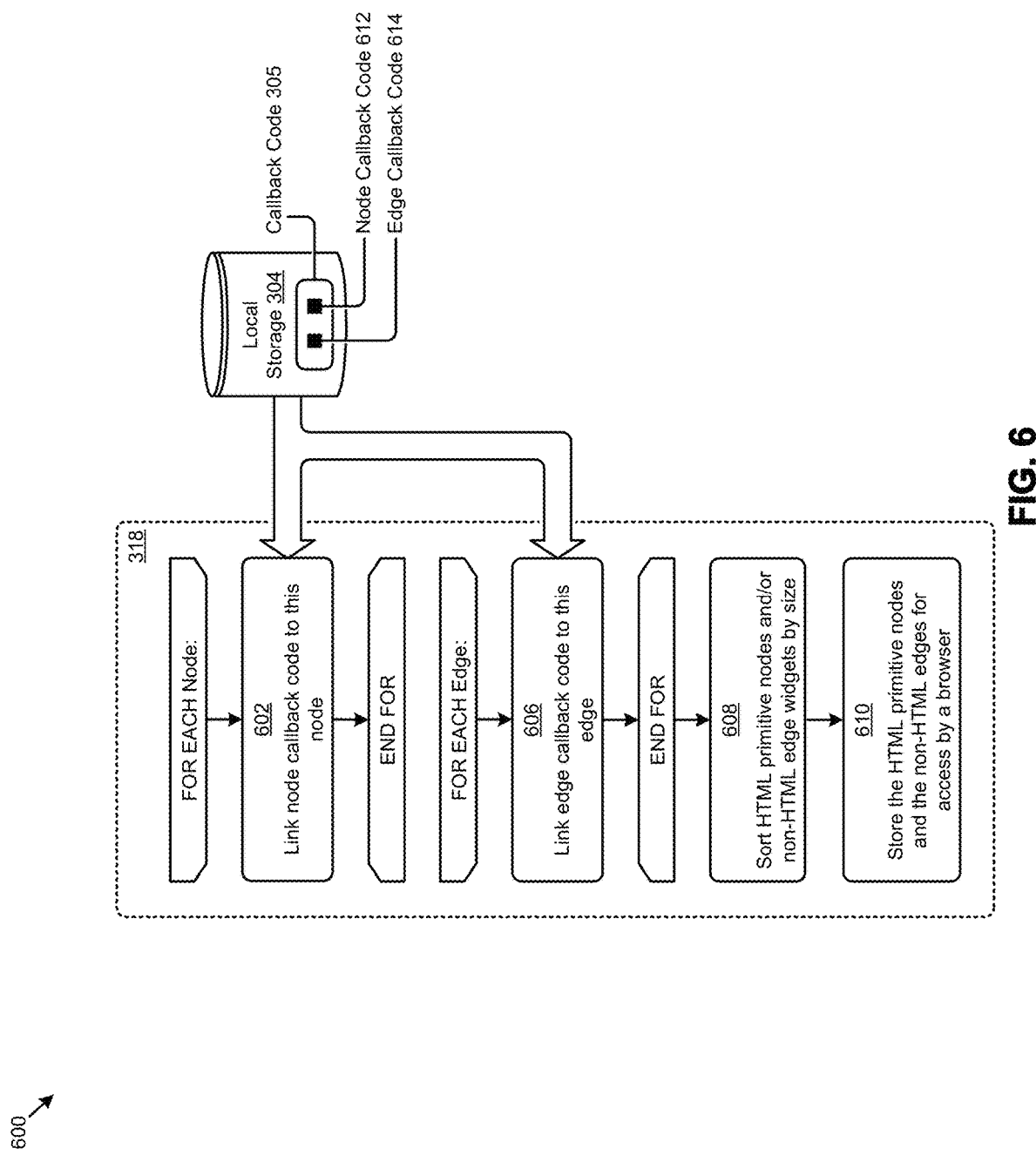
FIG. 6 illustrates an example multi-layer combiner data flow that is used to assemble nodes and edges into an HTML representation for high-performance browser rendering, according to an embodiment.

The discussion of compiler 120 in FIG. 3 further includes a mention node layout engine 314, edge layout engine 316, and multi-layer combiner 318, each of which are disclosed in further detail shown and described as pertains to FIG. 4, FIG. 5, and FIG. 6.

FIG. 4 illustrates an example node layout engine data flow 400 that is used to process nodes and edges separately for high-performance graph rendering in HTML browsers. As an option, one or more variations of node layout engine data flow 400 or any aspect thereof may be implemented in the context of the architecture and functionality of the embodiments described herein. The node layout engine data flow 400 or any aspect thereof may be implemented in any environment.

Operations of the shown data flow commence at step 402, which step accesses storage from any source to retrieve node descriptions (e.g., shown, for example as node descriptions 102₂). The node descriptions may initially be in any order. The node descriptions can be sorted with respect to primitive nodes and compound entities. Sorted representations as depicted in node descriptions 102₃ may comprise any combination of nodes and/or other compounds that form entities from other nodes and/or other entities. For example, a compound entity "$C_1$" might combine node "$N_1$" and node "$N_2$". Given node descriptions as in the foregoing, a complete set of entities to be represented as nodes on the graph can be captured. In cases where the node descriptions include compound entities as well as simple nodes, it is convenient for any entity that is a constituent of a compound entity to be listed before the combining compound entity. This is shown by the depiction of the order of entries of node descriptions 102₅. Step 404 serves to order the entries such that all constituents of any entity are listed before the combining compound entity. In doing so, the rendering engine will parse at least one occurrence of any entity before that entity is used in a compound entity. This facilitates fast rendering of nodes, even when there are compound nodes.

At step 406 each of the nodes and/or compound entities are considered individually. Each node or compound entity (e.g., simple node or compound of nodes or compounds of compounds, etc.) encountered receives an assignment of a type. A simple entity type applies to a single node and a compound entity type applies to a compound entity. Also, each node or compound entity encountered is annotated with the assignment of an HTML primitive that is selected from an HTML shape library 405, which might include parameterized HTML primitives 401. Strictly as one example, node descriptions 102₄ exemplifies an annotated ordered list of the set of entities. As shown, each node in node descriptions $102_4$ includes the node or compound by name as well as a corresponding HTML shape name (e.g., HTML shape1, HTML shape2) and applicable parameter(s).

At step 408, the nodes and/or compound entities are arranged such that the nodes do not overlap, and such that compound entities are represented with a bounding shape that encloses its constituents. In some cases, particular shapes and/or sizes are used to determine a painting order.

FIG. 5 illustrates an example edge layout engine data flow 500 that is used to process nodes and edges separately for high-performance graph rendering in HTML browsers. As an option, one or more variations of edge layout engine data flow 500 or any aspect thereof may be implemented in the context of the architecture and functionality of the embodiments described herein. The edge layout engine data flow 500 or any aspect thereof may be implemented in any environment.

The shown operations implement all or a portion of the functions of edge layout engine 316 of FIG. 3. In particular, performance of all or a portion of the steps of the edge layout engine 316 result in layout 550, as shown. More particularly, in a FOR EACH loop, all of the entities that are considered for a particular layout (e.g., node entities, edge entities, and compound entities) are considered in the several steps within the loop. At step 502, contents of node descriptions $102_5$ and contents of edge descriptions $104_2$ are considered together so as to determine relationships (e.g., edges) between any two nodes. As heretofore discussed, the contents of node descriptions $102_5$ might include compound entities. The contents of node descriptions $102_5$ might be initially sorted or unsorted, and the contents of node descriptions $102_5$ might include shape and parameter annotations.

The particular relationship might include a "to-from" relationship as are present in directed graphs, or a particular relationship might be agnostic to directionality of any edge of a graph. When all of the relationships have been determined then, at step 504, the faces of any two entities that have a determined relationship are assigned. The assignment of a face (e.g., a north face, a south face, an east face, a west face) can be determined based on a logical characteristic, or based on a spatial characteristic, or based on any other characteristic that is related to the two entities. The assignment of a face to an entity can be annotated using any known technique. As shown, the edges are codified into layout description $503_1$. After processing to determine assignments of faces, the layout description $503_1$ is annotated to produce layout description $503_2$. In the layout description $503_2$, each node that is connected by an edge includes an indication of the connection face. For example, and as depicted, an edge "$E_1$" is connected to node "$N_1$" and entity "$C_1$". Also, edge "$E_2$" is connected to node "$N_2$" as well as to entity "$C_1$". Each of node "$N_1$" and node "$N_2$" include an indication of a connection face. Specifically, the codification of node "$N_1$" includes an indication of an east face and the codification of node "$N_2$" includes an indication of a south face, and so on.

At step 506, an edge library 510 is consulted to select a non-HTML edge widget 501 from the library. The selection of a particular non-HTML edge widget 501 from the set of non-HTML edge widgets in the library is based at least in part on the relationship between the nodes for which the edge is being selected. For example, a directional edge might be selected where there is a "to-from" relationship between the nodes. Once the particular non-HTML edge widget 501 has been selected, the non-HTML edge widget 501 can be placed so as to connect the pair of entities. Step 508 observes the annotation of the assigned face (e.g., as assigned in step 504) and places the non-HTML edge widget 501 into the layout arrangement description 450. As such, upon completion of the FOR EACH loop, the layout 550 includes entities (node entities and compound entities) comprising HTML primitives in a first layer that are connected by non-HTML edge widgets in a second layer.

FIG. 6 illustrates an example multi-layer combiner data flow 600 that is used to assemble nodes and edges into an HTML representation for high-performance browser rendering. As an option, one or more variations of multi-layer combiner data flow 600 or any aspect thereof may be implemented in the context of the architecture and functionality of the embodiments described herein. The multi-layer combiner data flow 600 or any aspect thereof may be implemented in any environment.

The shown multi-layer combiner data flow 600 depicts one possible embodiment of an instance of multi-layer combiner 318. In this embodiment, node callback code 612 is assigned to each graph node entity (e.g., simple node or compound entity). For example, callback code pertaining to a particular node is assigned to the HTML primitive of a corresponding node. When a user interacts with that particular node, node callback code 612 is executed by the browser. Similarly, in this embodiment, edge callback code 614 is assigned to individual instances of the non-HTML edge widgets 501. For example, callback code pertaining to a particular edge is assigned to the non-HTML edge widget of a corresponding edge. When a user interacts with that particular edge, edge callback code 614 is executed by the browser.

The implementation and assignment of node callback code 612 to a node can be accomplished using JavaScript and/or any other technique supported by the target browser. In some cases, and as is depicted in step 602, the node callback code is assigned to the node by a link. Similarly, and as is depicted in step 606, the edge callback code is assigned to the edge by a link.

In some embodiments, and as depicted by step 608 and step 610, the edge primitives and/or the edge widgets can be sorted by size. This has the effect of prescribing a painting order that is honored by the browser. The two separate layers (e.g., HTML node layer 106 and non-HTML edge layer 108) are written to one or more files and stored in a location accessible to a browser in user environment 111.

In some cases, a graph can have two or more edges between the same pair of nodes. Sorting the edges by a size measure assures that, even if one edge is a relatively "fatter" edge (e.g., representative of a large quantity) and another edge is relatively "thinner" edge, the "thinner edge" is painted on top of the "fatter" edge such that a mouse or other pointer interaction can distinguish between the two edges, even though the two edges are overlapping in part.

Figure 7:
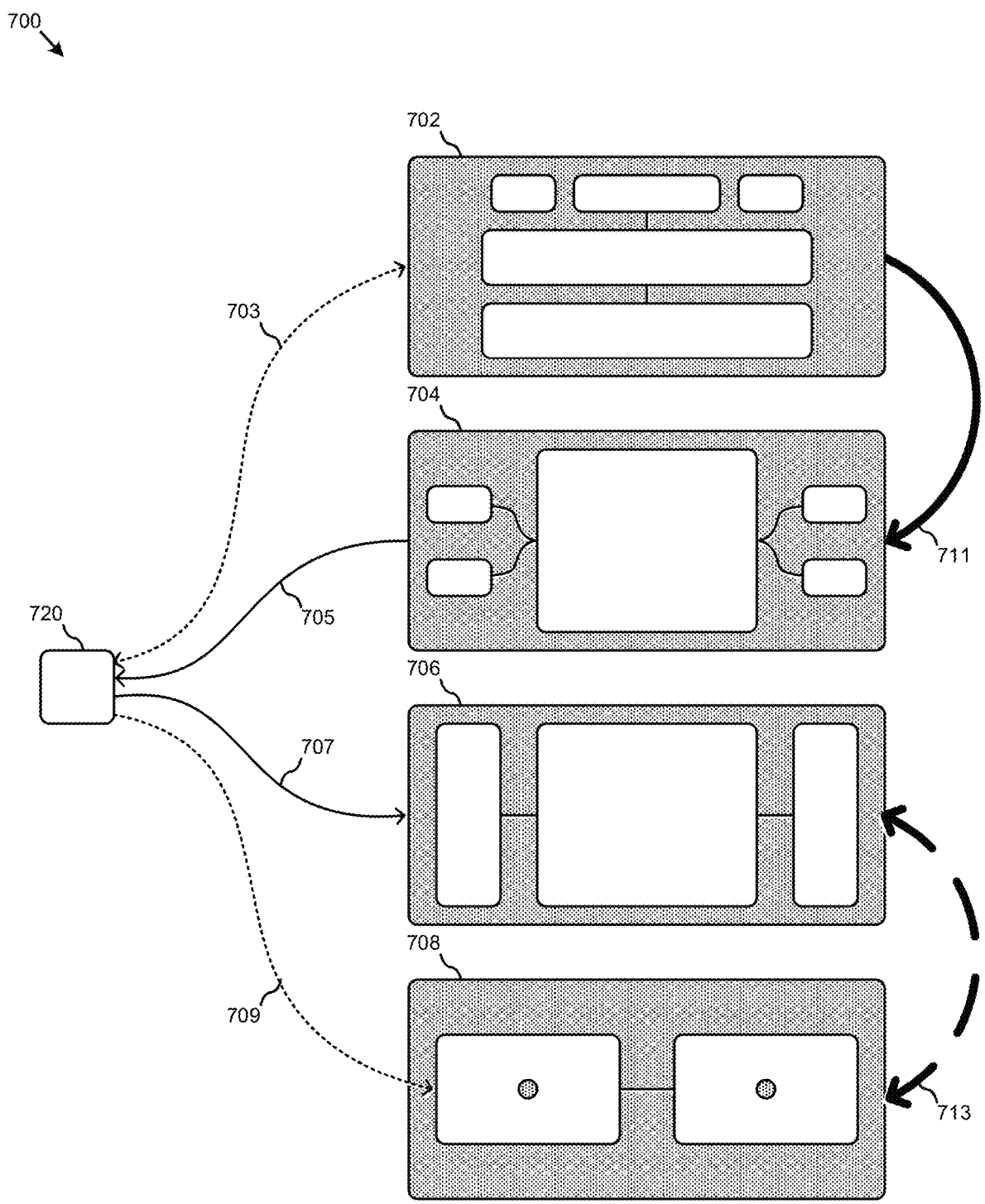
FIG. 7 depicts a rendered graph that shows a hierarchy of nodes and different types of edges, according to an embodiment.

FIG. 7 depicts a rendered graph 700 that shows a hierarchy of nodes and different types of edges. As an option, one or more variations of rendered graph 700 or any aspect thereof may be implemented in the context of the architecture and functionality of the embodiments described herein. The rendered graph 700 or any aspect thereof may be implemented in any environment.

Non-HTML edges have many variations. FIG. 7 shows but a few. Specifically, edge 703 is formed of a non-HTML edge widget that graphically represents a bidirectional dotted-line relationship between node 720 and compound entity 702. Edge 705 is formed of a non-HTML edge widget that graphically represents a unidirectional right-to-left relationship between compound entity 704 and node 720. Edge 707 is formed of a non-HTML edge widget that graphically represents a unidirectional left-to-right relationship between node 720 and compound entity 706. Edge 709 is formed of a non-HTML edge widget that graphically represents a dotted-line relationship between node 720 and a constituent entity within compound entity 708. Edge 711 is formed of a non-HTML edge widget that graphically represents a sized relationship between compound entity 702 and compound entity 704. The thickness and/or animation of the non-HTML edge widget can be used to represent a quantity. The thickness and/or animation of the non-HTML edge widget can be used to represent such a quantity and/or other characteristic. Edge 713 is formed of a non-HTML edge widget that graphically represents a sized non-persistent bidirectional relationship between compound entity 706 and compound entity 708. Any bidirectional relationship can be represented using two non-HTML edge widgets between the nodes. Specifically, a first non-HTML edge widget can be oriented in one direction and a second non-HTML edge widget can be oriented in the other direction. The two separate non-HTML edge widgets can be different, based at least in part on characteristics of the relationship and/or the quantity or quantities being represented.

Any edge can take on any of a set of characteristics expressed as key-value pairs. For example, in a graph that describes network traffic (edges) between computing sites (nodes), the amount of traffic can be represented as the key-value pair "traffic=10 Gb/sec". In some cases, the edge can be animated such that the edge visually represents ongoing changes. Strictly as one example, edge can be animated such that the edge visually fluctuates between a larger/thicker edge that represents "traffic=10 Gb/sec" and smaller/thinner edge that represents "traffic=100 Mb/sec".

Any non-HTML edge widget can include graphical characteristics that are representative of quantitative metrics between nodes. Strictly as examples, a node might represent a virtual machine, or a host, or a switch or port. Nodes can be decorated with visual indications corresponding to a quantitative or qualitative node characteristic. For example, a virtual machine node might include a node characteristic that is displayed as a text decoration referring to the tenant that owns that virtual machine. In some cases, a node might subsume many constituents, a quantity of which constituents might be represented by a text value widget or slider widget etc., that visually corresponds to the quantity being displayed.

Strictly as examples, an edge might represent a flow rate or a quantity of activity between the nodes. More specifically, an animated edge might provide a visual indication of backup activity between a first node (e.g., a first computing site) and a second node (e.g., a second computing site).

Additional Embodiments of the Disclosure

Additional Practical Application Examples

Figure 8:
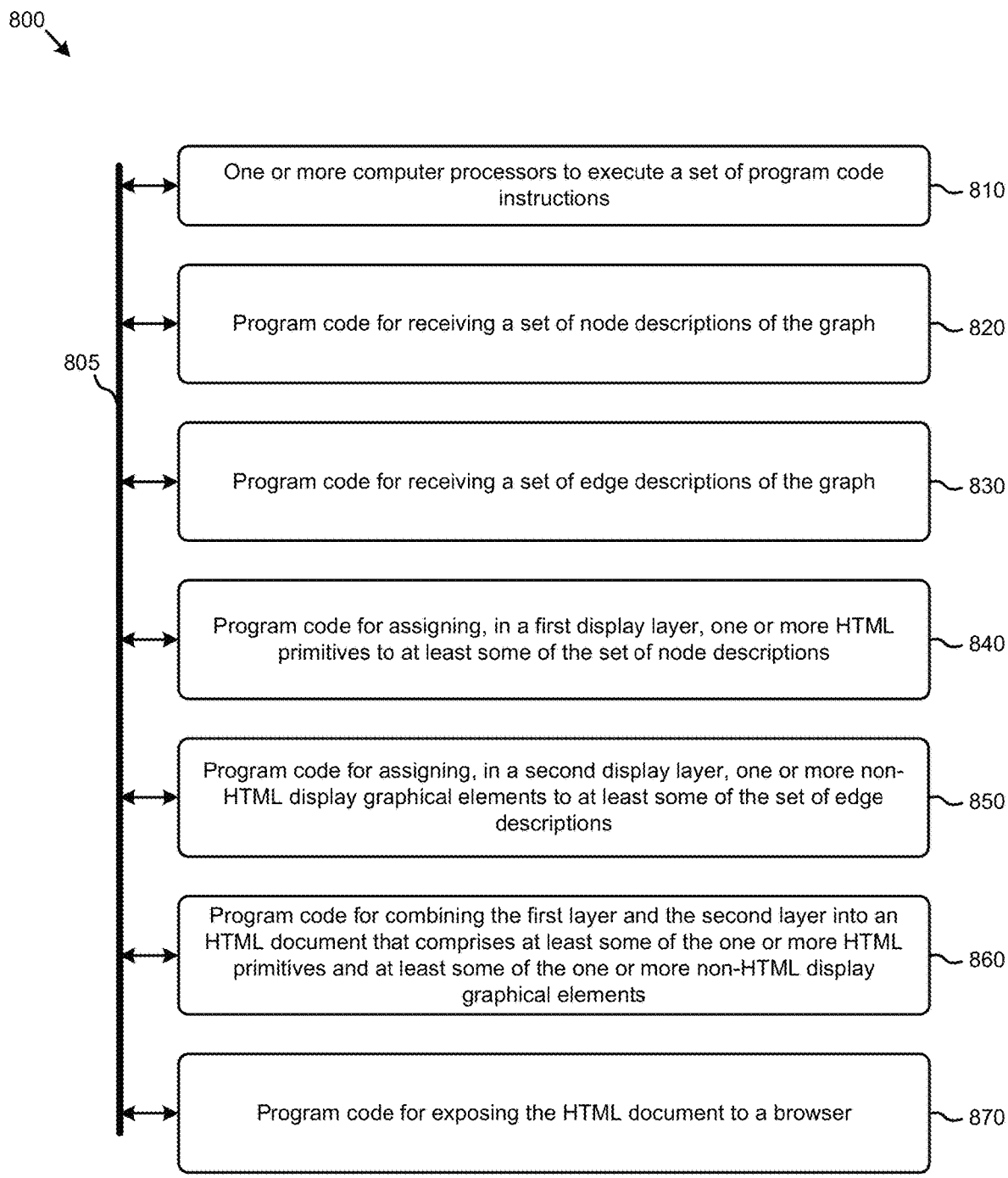
FIG. 8 depicts system components as arrangements of computing modules that are interconnected so as to implement certain of the herein-disclosed embodiments.

FIG. 8 depicts a system 800 as an arrangement of computing modules that are interconnected so as to operate cooperatively to implement certain of the herein-disclosed embodiments. This and other embodiments present particular arrangements of elements that, individually and/or as combined, serve to form improved technological processes that address representation of certain types of graphs in HTML render very slowly in a browser. The partitioning of system 800 is merely illustrative and other partitions are possible. As an option, the system 800 may be implemented in the context of the architecture and functionality of the embodiments described herein. Of course, however, the system 800 or any operation therein may be carried out in any desired environment.

The system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims.

The shown embodiment implements a portion of a computer system, presented as system 800, comprising one or more computer processors to execute a set of program code instructions (module 810) and modules for accessing memory to hold program code instructions to perform: receiving a set of node descriptions of the graph (module 820); receiving a set of edge descriptions of the graph (module 830); assigning, in a first display layer, one or more HTML primitives to at least some of the set of node descriptions (module 840); assigning, in a second display layer, one or more non-HTML display graphical elements to at least some of the set of edge descriptions (module 850); combining the first layer and the second layer into an HTML document that comprises at least some of the one or more HTML primitives and at least some of the one or more non-HTML display graphical elements (module 860); and sending or exposing the HTML document to a browser (module 870).

Variations of the foregoing may include more or fewer of the shown modules. Certain variations may perform more or fewer (or different) steps and/or certain variations may use data elements in more or in fewer (or different) operations.

System Architecture Overview

Additional System Architecture Examples

Figure 9:
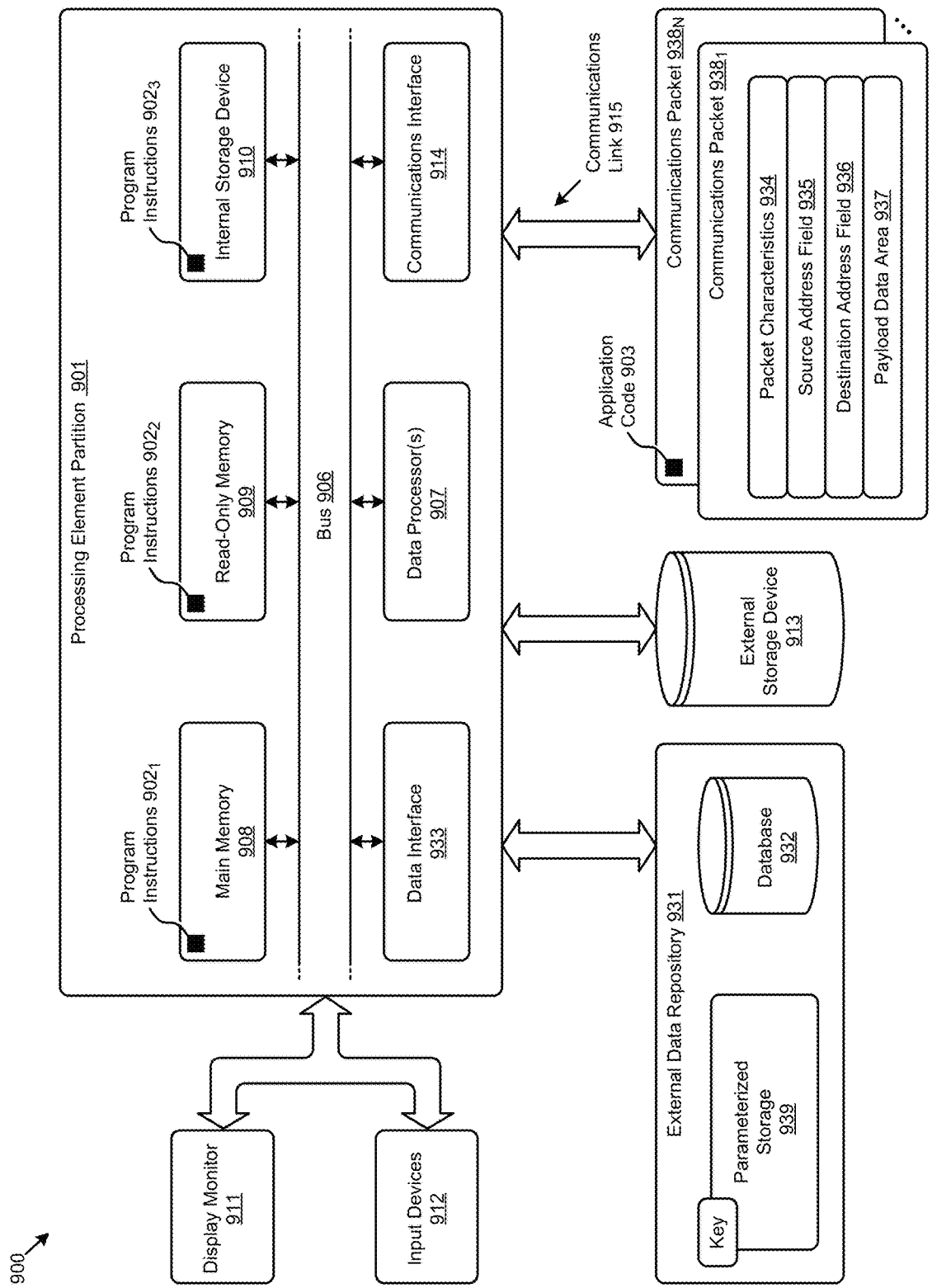
FIG. 9 depicts a block diagram of an instance of a computer system suitable for implementing embodiments of the present disclosure.

FIG. 9 depicts a block diagram of an instance of a computer system 900 suitable for implementing embodiments of the present disclosure. Computer system 900 includes a bus 906 or other communication mechanism for communicating information. The bus interconnects subsystems and devices such as a CPU, or a multi-core CPU (e.g., data processor 907), a system memory (e.g., main memory 908, or an area of random access memory (RAM)), a non-volatile storage device or non-volatile storage area (e.g., read-only memory or ROM 909), an internal storage device 910, a data interface 933, and a communications interface 914 (e.g., PHY, MAC, Ethernet interface, modem, etc.). The aforementioned components are shown within processing element partition 901, however other partitions are possible. The shown computer system 900 further comprises a display 911 (e.g., CRT or LCD), various input devices 912 (e.g., keyboard, cursor control, etc.), an external data repository 931, and an external storage device 913 (e.g., magnetic or optical).

According to an embodiment of the disclosure, computer system 900 performs specific operations by the data processor 907 executing one or more sequences of one or more program code instructions contained in a memory. Such instructions (e.g., program instructions $902_1$, program instructions $902_2$, program instructions $902_3$, etc.) can be contained in, or can be read into, a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) and/or software-based, and/or can be formed using a combination of hardware and software that implements logic and/or can carry out computations and/or processing steps using one or more processes and/or one or more tasks and/or one or more threads or any combination thereof.

According to an embodiment of the disclosure, computer system 900 performs specific networking operations using one or more instances of communications interface 914. Instances of communications interface 914 may comprise one or more networking ports that are configurable (e.g., pertaining to speed, protocol, physical layer characteristics, media access characteristics, etc.), and any particular instance of communications interface 914 or port thereto can be configured differently from any other particular instance. Portions of a communication protocol can be carried out in whole or in part by any instance of communications interface 914, and data (e.g., packets, data structures, bit fields, etc.) can be positioned in storage locations within communications interface 914, or within system memory, and such data can be accessed (e.g., using random access addressing, or using direct memory access DMA, etc.) by devices such as data processor 907.

Communications link 915 can be configured to transmit (e.g., send, receive, signal, etc.) any types of communications packets (e.g., communications packet $938_1$, ..., communications packet $938_N$) comprising any organization of data items. The data items can comprise a payload data area 937, a destination address field 936 (e.g., a destination IP address), a source address field 935 (e.g., a source IP address), and can include various encodings or formatting of bit fields to populate packet characteristics 934. In some cases, the packet characteristics include a version identifier, a packet or payload length, a traffic class, a flow label, etc. In some cases, payload data area 937 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 907 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 931, which in turn can be formatted into any one or more storage areas and which can comprise parameterized storage 939 accessible by a key (e.g., filename, table name, block address, offset address, etc.).

Execution of the sequences of instructions to practice certain embodiments of the disclosure are performed by a single instance of computer system 900. According to certain embodiments of the disclosure, two or more instances of computer system 900 coupled by a communications link 915 (e.g., LAN, PSTN, or wireless network) may perform the sequence of instructions required to practice embodiments of the disclosure using two or more instances of components of computer system 900.

Computer system 900 may transmit and receive messages such as data and/or instructions organized into a data structure (e.g., communications packets $938_1$, ..., $938_N$). The data structure can include program instructions (e.g., application code 903) communicated through communications link 915 and communications interface 914. Received program code may be executed by data processor 907 as it is received, and/or stored in the shown storage device, or in or upon any other non-volatile storage for later execution. Computer system 900 may communicate through a data interface 933 to a database 932 on an external data repository 931. Data items in a database can be accessed using a primary key (e.g., a relational database primary key).

Processing element partition 901 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having a plurality of computing elements, any of which computing elements are connected directly or indirectly to a communications link. A first partition can be configured to communicate to a second partition. A particular first partition and particular second partition can be defined around similarly-configured instances (e.g., processors in a processing element array) or can be defined around different (e.g., comprising disjoint sets of components).

A module as used herein can be implemented using any mix of any portions of the system memory and any extent of hard-wired circuitry including hard-wired circuitry embodied as a data processor 907. Some embodiments include one or more special-purpose hardware components (e.g., power control, logic, sensors, transducers, etc.). A module may include one or more state machines and/or combinational logic used to implement or facilitate the operational and/or performance characteristics pertaining to forming and rendering high-performance graphs in HTML browsers.

Various implementations of the database 932 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of forming and rendering high-performance graphs in HTML browsers). Such files or records can be brought into and/or stored in volatile or non-volatile memory.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
receiving a set of descriptions for a node and an edge in a graph for rendering the graph by separately processing nodes in a first layer from edges in a second layer and superimposing the first layer and the second layer on top of each other, wherein
the first layer including the node and the second layer including the edge are separately processed;
rendering the graph at least by:
processing the first layer at least by assigning an HTML (hypertext markup language) graphic primitive to the node in the first layer;
processing the second layer at least by assigning a non-HTML graphic primitive to the edge in the second layer;
superimposing the first layer and the second layer into a superimposed layer; and
sending the superimposed layer for rendering the graph.

2. The method of claim 1, wherein the set of descriptions includes descriptions for a combination of single nodes and compound nodes.

3. The method of claim 1, wherein the set of descriptions includes an edge description that further includes directionality of the edge.

4. The method of claim 1, wherein multiple edges corresponding to the set of descriptions respectively correspond to respective quantity measures.

5. The method of claim 4, wherein a first edge with a first quantity measure smaller than a second quantity of a second edge is displayed on top of the second edge in a user interface.

6. The method of claim 4, wherein the multiple edges corresponding to the set of descriptions correspond to an amount of backup traffic or an amount of network traffic.

7. The method of claim 1, further comprising assigning callback code or an animation to at least one of the node or the edge.

8. The method of claim 1, wherein the non-HTML graphic primitive includes a scalable vector graphic component, and the second layer only includes non-HTML graphic primitives.

9. The method of claim 1, wherein the node first layer comprises only nodes but not edges in the graph, and the second layer comprises only the edges but not the nodes in the graph.

10. The method of claim 9, wherein the node characteristic corresponds to an attribute of a virtual machine.

11. A non-transitory computer readable medium having stored thereon a sequence of instructions which, when stored in memory and executed by a processor, causes the processor to perform a set of acts, the set of acts comprising:
receiving a set of descriptions for a node and an edge in a graph for rendering the graph by separately processing nodes in a first layer from edges in a second layer and superimposing the first layer and the second layer on top of each other, wherein
the first layer including the node and the second layer including the edge are separately processed;
rendering the graph at least by:
processing the first layer at least by assigning an HTML (hypertext markup language) graphic primitive to the node in the first layer;
processing the second layer at least by assigning a non-HTML graphic primitive to the edge in the second layer;
superimposing the first layer and the second layer into a superimposed layer; and
sending the superimposed layer for rendering the graph.

12. The non-transitory computer readable medium of claim 11, wherein the set of descriptions includes descriptions for a combination of single nodes and compound nodes.

13. The non-transitory computer readable medium of claim 11, wherein the set of descriptions includes an edge descriptions that further include directionality of the edge.

14. The non-transitory computer readable medium of claim 11, wherein multiple edges corresponding to the set of descriptions respectively correspond to respective quantity measures.

15. The non-transitory computer readable medium of claim 14, wherein a first edge with a first quantity measure smaller than a second quantity of a second edge is displayed on top of the second edge in a user interface.

16. The non-transitory computer readable medium of claim 14, wherein multiple edges corresponding to the set of descriptions correspond to an amount of backup traffic or an amount of network traffic.

17. The non-transitory computer readable medium of claim 11, further comprising instructions which, when stored in the memory and executed by the processor, causes the processor to perform acts of assigning callback code or an animation to at least one of the node or the edge.

18. The non-transitory computer readable medium of claim 11, wherein the non-HTML graphic primitive includes a scalable vector graphic component, and the second layer only includes non-HTML graphic primitives.

19. A system comprising:
a non-transitory storage medium having stored thereon a sequence of instructions; and
a processor that executes the sequence of instructions to cause the processor to perform a set of acts, the set of acts comprising,
receiving a set of descriptions for a node and an edge in a graph for rendering the graph by separately processing nodes in a first layer from edges in a second layer and superimposing the first layer and the second layer on top of each other, wherein
the first layer including the node and the second layer including the edge are separately processed;
rendering the graph at least by:
processing the first layer at least by assigning an HTML (hypertext markup language) graphic primitive to the node in the first layer;
processing the second layer at least by assigning a non-HTML graphic element to the edge in the second layer;
superimposing the first layer and the second layer into a superimposed layer; and
sending the superimposed layer for rendering the graph.

20. The system of claim 19, wherein the set of descriptions comprises descriptions for a combination of single nodes and compound nodes.

* * * * *